(12) United States Patent
Lim et al.

(10) Patent No.: US 11,878,705 B2
(45) Date of Patent: Jan. 23, 2024

(54) METHOD AND APPARATUS FOR GENERATING TEST CASE FOR DYNAMIC VERIFICATION OF AUTONOMOUS DRIVING SYSTEM

(71) Applicants: Hyundai Motor Company, Seoul (KR); Kia Corporation, Seoul (KR); HYUNDAI AUTOEVER Corp., Seoul (KR)

(72) Inventors: Hong Yeol Lim, Incheon (KR); Bong Ju Kim, Gyeonggi-do (KR)

(73) Assignees: Hyundai Motor Company, Seoul (KR); Kia Corporation, Seoul (KR); Hyundai Autoever Corp., Seoul (KR)

( * ) Notice: Subject to any disclaimer, the term of this patent is extended or adjusted under 35 U.S.C. 154(b) by 82 days.

(21) Appl. No.: 17/387,339

(22) Filed: Jul. 28, 2021

(65) Prior Publication Data
US 2022/0135059 A1 May 5, 2022

(30) Foreign Application Priority Data
Nov. 4, 2020 (KR) .......................... 10-2020-0146361

(51) Int. Cl.
*B60W 50/00* (2006.01)
*B60W 50/06* (2006.01)
*B60W 60/00* (2020.01)
*B60W 50/02* (2012.01)

(52) U.S. Cl.
CPC ............ *B60W 50/06* (2013.01); *B60W 50/02* (2013.01); *B60W 60/001* (2020.02); *B60W 2420/42* (2013.01); *B60W 2420/52* (2013.01)

(58) Field of Classification Search
CPC ...... G07C 5/0808; G06Q 10/00; G06Q 50/30; G05D 1/0088
See application file for complete search history.

(56) References Cited

U.S. PATENT DOCUMENTS

| | | | | |
|---|---|---|---|---|
| 6,370,475 B1 * | 4/2002 | Breed | ..................... | G08G 1/161 340/436 |
| 6,405,132 B1 * | 6/2002 | Breed | .................. | B60N 2/2863 701/45 |
| 7,102,496 B1 * | 9/2006 | Ernst, Jr. | .......... | G08G 1/096725 340/436 |
| 7,840,777 B2 * | 11/2010 | Mykland | ............. | G06F 15/7867 712/15 |
| 8,442,739 B2 * | 5/2013 | Kuge | .................. | B60W 10/184 340/901 |
| 8,744,648 B2 * | 6/2014 | Anderson | ............... | G08G 1/166 701/3 |
| 8,849,515 B2 * | 9/2014 | Moshchuk | .......... | B62D 15/0265 340/436 |
| 9,151,625 B2 * | 10/2015 | Lee | ........................ | G01S 19/073 |

(Continued)

*Primary Examiner* — Ian Jen
(74) *Attorney, Agent, or Firm* — Fox Rothschild LLP

(57) ABSTRACT

A method and an apparatus for generating a test case (TC) for dynamic verification of an autonomous driving system are provided. The method includes receiving an input signal and generating a temporary TC based on the input signal. A confirmed TC is determined based on a first output signal corresponding to the input signal and a second output signal corresponding to the temporary TC. A final TC is determined by re-arranging the confirmed TC and the final TC is transmitted to an external device.

12 Claims, 6 Drawing Sheets

| AUTOMATION PHASE | SAE CLASSIFICATION STANDARD | SYSTEM ROLE | DRIVER ROLE |
|---|---|---|---|
| LEVEL 0 | NO AUTOMATION | A SYSTEM IS TEMPORARILY INVOLVED INTO EMERGENCY SITUATION OR PROVIDES ONLY WARNING | A DRIVER DRIVES ALL DRIVING TYPES |
| LEVEL 1 | DRIVER ASSISTANCE | THE SYSTEM PERFORMS SOME DRIVING FUNCTIONS, SUCH AS STEERING OR ACCELERATION/DECELERATION, TOGETHER WITH DRIVER DRIVING, IN A NORMAL OPERATION SECTION, ON VEHICLE | THE DRIVER DETERMINES AN OPERATION STATE/TIMING OF SYSTEM IN LEVEL 1, PERFORMS OTHER DRIVING FUNCTIONS (INCLUDING DRIVING CONTEXT/VEHICLE DRIVING/MONITORING OF SYSTEM IN LEVEL 1 AND INSTANTLY COPING WITH EMERGENCY SITUATION) EXCEPT FOR MANIPULATING OF A STEERING WHEEL OR AN ACCELERATION/DECELERATION PEDAL |
| LEVEL 2 | PARTIAL AUTOMATION | THE SYSTEM PERFORMS STEERING AND ACCELERATION/DECELERATION IN PLACE OF A DRIVER STEERING AND MONITORING ACCELERATION/DECELERATION IN STATE THAT THE DRIVER GETS ON VEHICLE | THE DRIVER DETERMINES AN OPERATION STATE/TIMING OF THE SYSTEM, PERFORMS OTHER DRIVING FUNCTIONS (INCLUDING DRIVING CONTEXT/VEHICLE DRIVING/MONITORING OF SYSTEM IN LEVEL 2 AND INSTANTLY COPING WITH EMERGENCY SITUATION) EXCEPT FOR MANIPULATING OF A STEERING WHEEL OR AN ACCELERATION/DECELERATION PEDAL |
| LEVEL 3 | CONDITIONAL AUTOMATION | THE SYSTEM TRANSFERS A DRIVING CONTROL RIGHT TO THE DRIVER UNDER DRIVING SITUATIONS OTHER THAN A CONDITIONAL SITUATION AND PERFORMS A DRIVING FUNCTION SUCH AS STEERING AND ACCELERATION/DECELERATION | THE DRIVER DETERMINES AN OPERATION STATE/TIMING OF THE SYSTEM, AND PERFORMS OTHER DRIVING FUNCTION(S) EXCEPT FOR MANIPULATING OF STEERING WHEEL OR ACCELERATION/DECELERATION PEDAL OR MONITORING A DRIVING CONTEXT(THE DRIVER IS ABLE TO COPE WITH AN EMERGENCY SITUATION BY RECEIVING A CONTROL RIGHT WHEN THERE IS A REQUEST FOR TRANSFERRING THE CONTROL RIGHT BY THE SYSTEM IN LEVEL 3) |
| LEVEL 4 | HIGH AUTOMATION | THE SYSTEM PERFORMS ALL DRIVING FUNCTIONS IN STATE THAT DRIVER GETS ON IN EXTREMELY EXCEPTIONAL SITUATION | THE DRIVER IS SELECTIVELY ABLE TO COPE WITH AN EMERGENCY SITUATION WHEN THE SYSTEM IN LEVEL 4 REQUESTS TRANSFERRING THE CONTROL RIGHT |
| LEVEL 5 | FULL AUTOMATION | THE SYSTEM PERFORMS FULL DRIVING FUNCTIONS TO COPE WITH ALL SITUATIONS WITHOUT A DRIVER | THE DRIVER DOES NOT PERFORM DRIVING FUNCTIONS OTHER THAN DETERMINING THE OPERATING STATE OF SYSTEM |

(56) References Cited

U.S. PATENT DOCUMENTS

| | | | | |
|---|---|---|---|---|
| 9,182,761 B2* | 11/2015 | Fujita | | G05D 1/0212 |
| 10,255,168 B2* | 4/2019 | Stefan | | G06F 11/3604 |
| 10,408,406 B1* | 9/2019 | Rice | | F21S 41/166 |
| 10,635,761 B2* | 4/2020 | English | | G06F 30/20 |
| 10,642,276 B2* | 5/2020 | Huai | | B60W 40/09 |
| 10,789,155 B2* | 9/2020 | Sato | | G06F 11/3688 |
| 10,824,543 B2* | 11/2020 | Sharma | | G06N 20/00 |
| 10,956,310 B2* | 3/2021 | Saha | | G06N 3/04 |
| 11,467,590 B2* | 10/2022 | Halder | | G06N 3/006 |
| 11,505,207 B2* | 11/2022 | Narang | | G01C 21/3673 |
| 2002/0082806 A1* | 6/2002 | Kaub | | G08G 1/164 |
| | | | | 702/182 |
| 2005/0192727 A1* | 9/2005 | Shostak | | G07C 5/0808 |
| | | | | 701/1 |
| 2005/0273218 A1* | 12/2005 | Breed | | G07C 5/085 |
| | | | | 701/2 |
| 2006/0025897 A1* | 2/2006 | Shostak | | G08G 1/017 |
| | | | | 701/1 |
| 2008/0097699 A1* | 4/2008 | Ono | | B62D 15/0265 |
| | | | | 701/300 |
| 2008/0215231 A1* | 9/2008 | Breed | | G08G 1/161 |
| | | | | 382/104 |
| 2010/0179731 A1* | 7/2010 | Le | | B60R 21/0136 |
| | | | | 701/47 |
| 2011/0106442 A1* | 5/2011 | Desai | | G08G 1/161 |
| | | | | 701/532 |
| 2011/0307139 A1* | 12/2011 | Caminiti | | G08G 1/163 |
| | | | | 701/32.2 |
| 2012/0083947 A1* | 4/2012 | Anderson | | G05D 1/0088 |
| | | | | 701/1 |
| 2012/0116819 A1* | 5/2012 | Hertenstein | | G06Q 10/10 |
| | | | | 705/4 |
| 2013/0325306 A1* | 12/2013 | Caveney | | B60W 30/0953 |
| | | | | 701/117 |
| 2014/0037138 A1* | 2/2014 | Sato | | G06V 20/58 |
| | | | | 382/103 |
| 2015/0134232 A1* | 5/2015 | Robinson | | G08G 1/0145 |
| | | | | 701/117 |
| 2015/0339217 A1* | 11/2015 | Avgerinos | | G06F 11/3688 |
| | | | | 717/131 |
| 2017/0132117 A1* | 5/2017 | Stefan | | G06F 11/3684 |
| 2017/0270236 A1* | 9/2017 | Yamaura | | G06F 30/20 |
| 2018/0025430 A1* | 1/2018 | Perl | | G01C 21/3697 |
| | | | | 705/4 |
| 2018/0060219 A1* | 3/2018 | Sethu | | G06F 11/3684 |
| 2019/0146492 A1* | 5/2019 | Phillips | | G05B 13/041 |
| | | | | 701/23 |
| 2019/0155291 A1* | 5/2019 | Heit | | B60W 30/00 |
| 2019/0278699 A1* | 9/2019 | Sharma | | G06F 9/451 |
| 2019/0310654 A1* | 10/2019 | Halder | | B60W 60/00 |
| 2020/0074266 A1* | 3/2020 | Peake | | G06F 18/2411 |
| 2020/0125472 A1* | 4/2020 | Arechiga Gonzalez | | |
| | | | | G06F 11/3461 |
| 2020/0192359 A1* | 6/2020 | Aragon | | B60W 60/0053 |
| 2020/0193741 A1* | 6/2020 | Cho | | G07C 5/10 |
| 2020/0242287 A1* | 7/2020 | Yamanouchi | | G08G 1/0141 |
| 2020/0247432 A1* | 8/2020 | Misra | | B60W 60/0015 |

* cited by examiner

| AUTOMATION PHASE | SAE CLASSIFICATION STANDARD | SYSTEM ROLE | DRIVER ROLE |
|---|---|---|---|
| LEVEL 0 | NO AUTOMATION | A SYSTEM IS TEMPORARILY INVOLVED INTO EMERGENCY SITUATION OR PROVIDES ONLY WARNING | A DRIVER DRIVES ALL DRIVING TYPES |
| LEVEL 1 | DRIVER ASSISTANCE | THE SYSTEM PERFORMS SOME DRIVING FUNCTIONS, SUCH AS STEERING OR ACCELERATION/DECELERATION, TOGETHER WITH DRIVER DRIVING, IN A NORMAL OPERATION SECTION, ON VEHICLE | THE DRIVER DETERMINES AN OPERATION STATE/TIMING OF SYSTEM IN LEVEL 1, PERFORMS OTHER DRIVING FUNCTIONS (INCLUDING DRIVING CONTEXT/VEHICLE DRIVING/MONITORING OF SYSTEM IN LEVEL 1 AND INSTANTLY COPING WITH EMERGENCY SITUATION) EXCEPT FOR MANIPULATING OF A STEERING WHEEL OR AN ACCELERATION/DECELERATION PEDAL |
| LEVEL 2 | PARTIAL AUTOMATION | THE SYSTEM PERFORMS STEERING AND ACCELERATION /DECELERATION IN PLACE OF A DRIVER STEERING AND MONITORING ACCELERATION/DECELERATION IN STATE THAT THE DRIVER GETS ON VEHICLE | THE DRIVER DETERMINES AN OPERATION STATE/TIMING OF THE SYSTEM, PERFORMS OTHER DRIVING FUNCTIONS (INCLUDING DRIVING CONTEXT/VEHICLE DRIVING/MONITORING OF SYSTEM IN LEVEL 2 AND INSTANTLY COPING WITH EMERGENCY SITUATION) EXCEPT FOR MANIPULATING OF A STEERING WHEEL OR AN ACCELERATION/DECELERATION PEDAL |
| LEVEL 3 | CONDITIONAL AUTOMATION | THE SYSTEM TRANSFERS A DRIVING CONTROL RIGHT TO THE DRIVER UNDER DRIVING SITUATIONS OTHER THAN A CONDITIONAL SITUATION AND PERFORMS A DRIVING FUNCTION SUCH AS STEERING AND ACCELERATION/DECELERATION | THE DRIVER DETERMINES AN OPERATION STATE/TIMING OF THE SYSTEM, AND PERFORMS OTHER DRIVING FUNCTIONS) EXCEPT FOR MANIPULATING OF STEERING WHEEL OR ACCELERATION/DECELERATION PEDAL OR MONITORING A DRIVING CONTEXT(THE DRIVER IS ABLE TO COPE WITH AN EMERGENCY SITUATION BY RECEIVING A CONTROL RIGHT WHEN THERE IS A REQUEST FOR TRANSFERRING THE CONTROL RIGHT BY THE SYSTEM IN LEVEL 3) |
| LEVEL 4 | HIGH AUTOMATION | THE SYSTEM PERFORMS ALL DRIVING FUNCTIONS IN STATE THAT DRIVER GETS ON IN EXTREMELY EXCEPTIONAL SITUATION | THE DRIVER IS SELECTIVELY ABLE TO COPE WITH AN EMERGENCY SITUATION WHEN THE SYSTEM IN LEVEL 4 REQUESTS TRANSFERRING THE CONTROL RIGHT |
| LEVEL 5 | FULL AUTOMATION | THE SYSTEM PERFORMS FULL DRIVING FUNCTIONS TO COPE WITH ALL SITUATIONS WITHOUT A DRIVER | THE DRIVER DOES NOT PERFORM DRIVING FUNCTIONS OTHER THAN DETERMINING THE OPERATING STATE OF SYSTEM |

Fig. 1

METHOD AND APPARATUS FOR GENERATING TEST CASE FOR DYNAMIC VERIFICATION OF AUTONOMOUS DRIVING SYSTEM

CROSS-REFERENCE TO RELATED APPLICATION

This application claims the benefit of priority to Korean Patent Application No. 10-2020-0146361, filed on Nov. 4, 2020, the entire contents of which are incorporated herein by reference.

TECHNICAL FIELD

The present disclosure relates to an autonomous driving technology, and more particularly, relates to a technology of generating a test case having reliability for dynamic verification of software installed in an autonomous driving system.

BACKGROUND

An autonomous driving vehicle requires an ability to adaptively cope with a surrounding situation changing in real time while the vehicle is operating. To mass-produce and activate the autonomous driving vehicle, a reliable determination control function is required. Recently, an autonomous driving vehicle launched in a market performs driving, braking, and steering in place of a driver to reduce the fatigue of the drier.

Recently, autonomous driving vehicles are provided with a Highway Driving Assist (HAD) function, a Driver Status Warning (DSW) function of outputting a warning alarm through cluster by determining driver carelessness and status abnormalities such as drowsy driving and distraction, a Driver Awareness Warning function of determining, using a front camera, whether a vehicle is driving unstably while crossing lanes, and a Forward Collision Avoidance Assist (FCA) function or an Active Emergency Brake System (AEBS) of performing sudden braking in head-on collision.

Software installed in an autonomous driving controller generates various control commands by receiving and reprocessing information recognized by dynamic sensors, such as a gyro sensor and an acceleration sensor, of a vehicle and surrounding recognition sensors, such as Global positioning system (GPS), a LiDAR sensor, a radar sensor, a camera, or a precision map. The software installed in the autonomous driving controller has a complex structure in which various detailed modules for positioning/recognition/determining/controlling are dependent on each other, thereby increasing the risk of malfunction.

Accordingly, there is a need for a method for verifying the reliability and safety of the software installed in an autonomous driving controller. The method for verifying the software for autonomous driving may be mainly classified into code-based verification and target board-based verification manners. The code-based verification manner generally includes static verification and dynamic verification.

The dynamic verification in the field of verification of software (hereinafter, SW; having the same meaning as that of the source code) is to verify whether the output of the SW for the input of the system satisfies a system design specification and a SW design specification, and includes a unit test, an integral test, and a system test. The static verification has a disadvantage in that errors cannot be detected on a target board in real time.

The conventional dynamic verification employs a test case automatically generated by a tool, which makes it difficult to accurately reflect a real driving environment. Accordingly, a result obtained through the conventional dynamic verification may not ensure reliability. The target board-based verification is a verification manner of employing test cases generated in the dynamic verification. The autonomous driving controller may be equipped with various chips. When a process managing device is provided by a chip manufacturer, errors occurring during a real action may be detected through a hardware profiling scheme. Accordingly, it is important to generate a test case having reliability to exactly verify a control module mounted on the target board.

SUMMARY

The present disclosure has been made to solve the above-mentioned problems occurring in the prior art while advantages achieved by the prior art are maintained intact.

An aspect of the present disclosure provides a method and an apparatus for generating a test case for dynamic verification of an autonomous driving system. Another aspect of the present disclosure provides a method and an apparatus for generating a test case for dynamic verification of an autonomous driving system, capable of generating a reliable test case based on data measured in a real vehicle to dynamically verify autonomous driving software.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a method for generating a test case (TC) for dynamic verification of an autonomous driving system may include receiving an input signal, generating a temporary TC based on the input signal, determining a confirmed TC based on a first output signal corresponding to the input signal and a second output signal corresponding to the temporary TC, determining a final TC by re-arranging the confirmed TC, and transmitting the final TC to an external device.

According to an exemplary embodiment, the input signal may be received from an external sensor and a signal gateway. The external sensor may include at least one of a Global Navigation Satellite System (GNSS), a camera, a LiDAR or a radar. The generating of the temporary TC based on the input signal may include re-sampling the input signal and re-arranging the re-sampled input signal in a random time array. Additionally, the input signal may be re-sampled in a specific period, and the specific period may be determined based on the fastest signal of the input signal.

According to an exemplary embodiment, the method may include performing inverse re-sampling for the temporary TC, transmitting the temporary TC to a sub-controller, and transmitting the input signal to a main controller. The first output signal may be generated by the main controller and transmitted to the sub-controller, and the second output signal may be generated by the sub-controller. The method may further include comparing a difference value between the first output signal and the second output signal with a specified threshold value. A temporary TC making a difference value less than the threshold value is determined as the confirmed TC, and a temporary TC making a difference value equal to or greater than the threshold value may be discarded.

According to an exemplary embodiment, the method may further include applying a weight to each confirmed TC such that the weight is inversely proportional to the difference value and re-arranging the confirmed TC based on the weight. The final TC may be determined by re-arranging input signals substituting the re-arranged confirmed TC and the discharged temporary TC. The method may further include updating and swapping a double buffer in real time through a moving re-arrange scheme, and transmitting all signals, which contained in the double buffer, to a personal computer (PC).

According to another exemplary embodiment, an apparatus for generating a test case (TC) for dynamic verification of an autonomous driving system, may include a sensor configured to output an input signal, a TC builder configured to generate a temporary TC based on the input signal received from the sensor, a main controller configured to generate a first output signal based on the input signal received from the TC builder, and a sub-controller configured to generate a second output signal by receiving the temporary TC from the TC builder. The TC builder may be configured to transmit a final TC to an external device after re-arranging a confirmed TC which is determined based on a difference value between the first output signal and the second output signal.

The input signal may be received from an external sensor and a signal gateway. The external sensor may include at least one of a Global Navigation Satellite System (GNSS), a camera, a LiDAR or a radar. Additionally, the TC builder may be configured to generate the temporary TC by re-sampling the input signal and re-arranging a re-sampled input signal in a random time array. The input signal may be re-sampled in a specific period, and the specific period may be determined based on a fastest signal of the input signal.

According to an exemplary embodiment, the TC builder may be configured to perform inverse re-sampling for the temporary TC and transmit the inverse re-sampling result to the sub-controller, and the first output signal may be transmitted to the sub-controller, and the sub-controller may be configured to calculate a difference value between the first output signal and the second output signal and transmits the difference value to the TC builder. The TC builder may be configured to determine, as the confirmed TC, a temporary TC making a difference value, which is between the first output signal and the second output signal, less than a specified threshold value, and discard a temporary TC making a difference value, which is between the first output signal and the second output signal, equal to or greater than the threshold value.

The TC builder may be configured to apply a weight to each confirmed TC such that the weight is inversely proportional to the difference value, and re-arrange the confirmed TC based on the weight. The final TC may be determined by re-arranging input signals substituting the re-arranged confirmed TC and the discharged temporary TC. The TC builder may be configured to update and swap a double buffer in real time through a moving re-arrange scheme, and transmit all signals, which are contained in the double buffer, to a personal computer (PC).

BRIEF DESCRIPTION OF THE DRAWINGS

The above and other objects, features and advantages of the present disclosure will be more apparent from the following detailed description taken in conjunction with the accompanying drawings:

FIG. 1 is a table showing automation levels defined for an autonomous driving vehicle;

DETAILED DESCRIPTION

Figure 2:
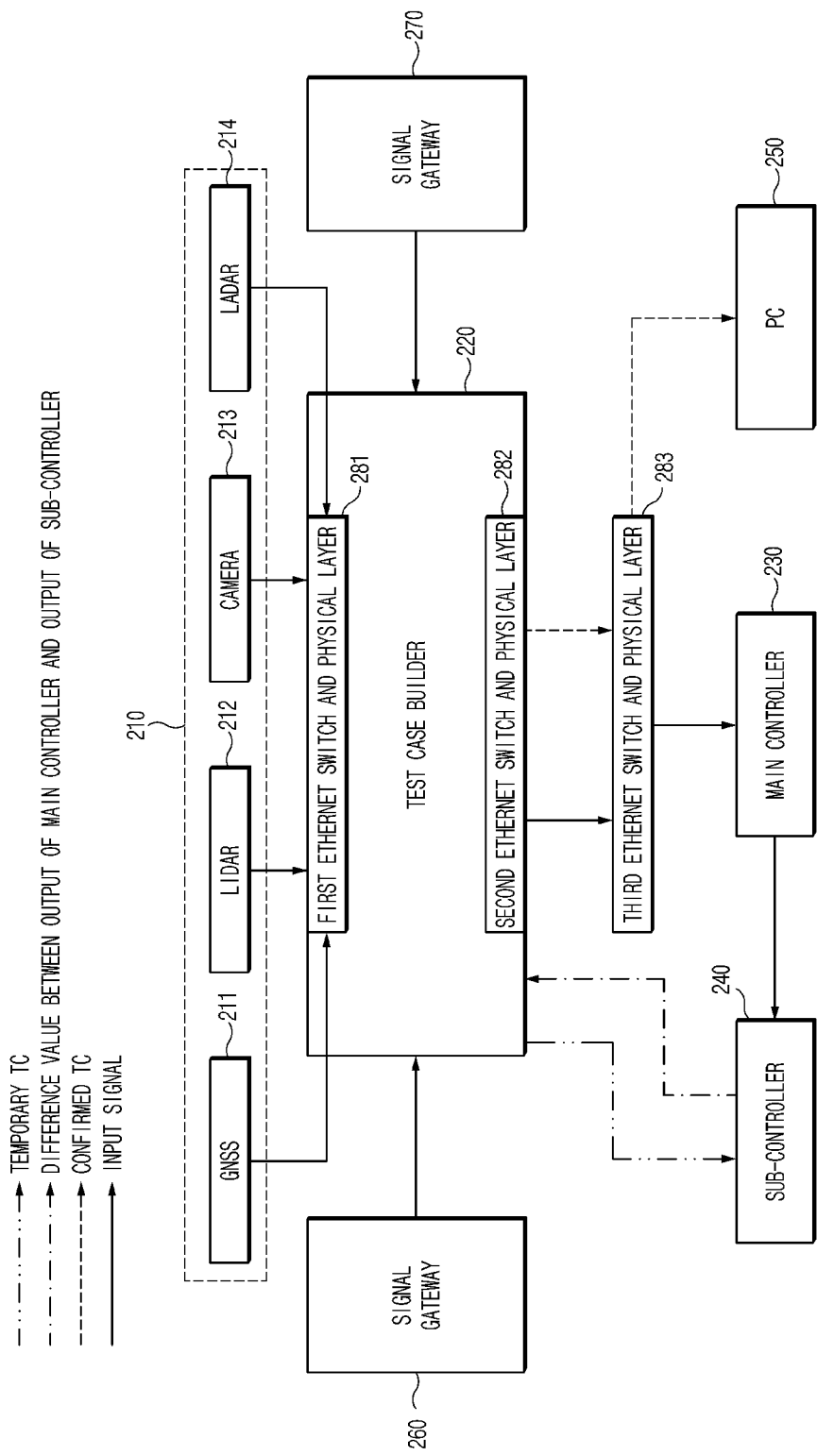
FIG. 2 is a block diagram illustrating the structure of an autonomous driving system, according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to accompanying drawings. In adding the reference numerals to the components of each drawing, it should be noted that the identical or equivalent component is designated by the identical numeral even when they are displayed on other drawings. In addition, in the following description of an embodiment of the present disclosure, a detailed description of well-known features or functions will be ruled out in order not to unnecessarily obscure the gist of the present disclosure.

In describing the components of the exemplary embodiment according to the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined in the present application.

Hereinafter, embodiments of the present disclosure will be described with reference to FIGS. 1 to 6. A software (hereinafter, referred to as "SW") dynamic verification manner may be mainly classified into a black box test and a white box test. According to the black box test, which is a manner for performing a test in terms of the execution of a system, the SW is verified by generating a test case (hereinafter, referred to as a "TC"), defining an expected output value for each TC, and then applying the TC to a relevant system to determine whether an expected value for the relevant TC is output. Accordingly, the black box test is performed to verify the validity of the operation for the relevant SW.

According to the white box test, which is a manner for performing a test in terms of SW execution, a path in which a relevant SW is executed is determined to verify whether an unnecessary code or deadline (a section without execution) is present. The black box test and the white box test require TCs to verify a system or SW. Accordingly, the selection for the TC is important to enhance the reliability for the verification result. The black box test has a difficulty in ensuring reliability for the verification result at an initial development stage, in which a system limitation and detailed SW specifications are not defined, because both a correct input and an incorrect input may be combined.

The white box test may employ an automation tool because an execution path and coverage are analyzed in a code level. However, since the white box test may not operate a verification tool based on the detailed SW specification at the initial development stage, verification results may be generated based on unrealistic input values, which is similar to the black box test. The white box test and the black box test may not provide a reliable verification result to a SW developer or a system specification developer at the initial development stage in which a system limitation and a detailed SW specification are not defined.

The present disclosure is to provide a dynamic verification result having reliability for the relevant SW at the initial development stage to solve the above problems. Accordingly, an autonomous driving controller according to an exemplary embodiment of the present disclosure may include a TC builder and is configured to operate the TC builder to generate a dynamic verification result at specific time intervals, by re-arranging all input data, during driving in a specific period and then applying the re-arrangement to a personal computer (PC) operating a dynamic verification tool.

FIG. 1 is a table showing automation levels defined for an autonomous driving vehicle. The autonomous driving vehicle refers to a vehicle which self-drives while minimizing the driving operation by a driver by recognizing a driving environment, determining a dangerous situation, and controlling a driving path for itself. Ultimately, the autonomous driving vehicle refers to a vehicle which is able to drive, operate, and park without human manipulation, and is focused on a vehicle having the most advanced autonomous driving technology (that is, an ability to operate a vehicle without an active control of a driver or without monitoring by the driver) which is the core base of the autonomous driving vehicle.

Referring to FIG. 1, in the automation phases LEVEL 0 to 2, the driving environment is monitored by a driver. Meanwhile, in the automation stages LEVEL 3 to 5, the driving environment is monitored by an automated driving system. However, the concept of an autonomous vehicle, which is currently being released, may refer to an intermediate automation phase while aiming at a fully autonomous vehicle and may correspond to a goal-oriented concept on the premise of mass production and commercialization of the fully autonomous vehicle.

An autonomous driving control method according to the present disclosure may be applied to an autonomous vehicle corresponding to LEVEL 2 (partially autonomous driving) and LEVEL 3 (conditionally autonomous driving) among automation phases of autonomous driving illustrated in FIG. 1, but the present disclosure is not limited thereto. For example, the autonomous driving control method may be applied to an autonomous driving vehicle supporting various automation phases. The automation levels of the autonomous driving vehicle based on the American Society of Automotive Engineers (SAE) may be classified as in the table of FIG. 1.

FIG. 2 is a block diagram illustrating the structure of an autonomous driving system, according to an exemplary embodiment of the present disclosure. Referring to FIG. 2, an autonomous driving system 200 may include a sensor 210, a test case (TC) builder 220, a main controller 230, a sub-controller 240, a personal computer (PC) 250, signal gateways 260 and 270, and first to third Ethernet switch and physical layers 281, 282, and 283. According to an exemplary embodiment, the autonomous driving system 200 may be a test case building device for dynamic verification of the autonomous driving system.

The autonomous driving system 200 may further include the test case builder 220 to generate a test case in real time, the PC 250 executed with a dynamic verification tool in background, and the sub-controller 240 to enhance the reliability for the TC, in addition to the sensor 210 and the main controller 230 which are components of the conventional autonomous driving system. According to an exemplary embodiment, the TC builder 220 and the sub-controller 240 may be configured exchange information together via a Controller Area Network (CAN).

The sensor 210 may include a Global Navigation Satellite System (GNSS) 211, a LiDAR 212, a camera 213, and a radar 214, but the present disclosure is not limited thereto. The first Ethernet switch and physical layer 281 and the second Ethernet switch physical layer 282 may be provided in the TC builder 220. The TC builder 220 may be configured to receive various input signals from the sensor 210 through the first Ethernet switch and physical layer 281.

The TC builder 220 may be configured to receive various input signals from an external device through the signal gateways 260 and 270. For example, the external device may include at least one of a warning alarm device 621 of FIG. 6, a human machine interface (HMI) 622, a direction indicator 623, a hazard light 624, a braking system 625, and a posture control system 626, a steering system 627, a transmission system 628, a driving system 629, a biometric sensor 607, or various driver assistance systems (not illustrated) for autonomous driving.

The TC builder 220 may be configured to transmit an input signal received through the second Ethernet switch and physical layer 282 and the third Ethernet switch and physical layer 283 to the main controller 230. The main controller 230 may be configured to generate a first output signal based on the input signal received from the TC builder 220. In particular, the generated first output signal may be transmitted to the sub-controller 240. All input signals applied to the TC builder 220 may be re-sampled at specific time intervals. The TC builder 220 may be configured to generate a temporary TC by re-arranging the re-sampled input signal in a random time array.

The TC builder 220 may be configured to change (that is, inverse re-sample) each of the input signals (that is, the temporary TC), which are re-arranged, at an original sample rate and then may be configured to transmit the changed result to the sub-controller 240. According to an exemplary embodiment, the TC builder 220 may be configured to re-arrange the re-sampled input signal through a moving re-arrange method. The sub-controller 240 may be configured to generate a second output signal based on the temporary TC. The sub-controller 240 may be configured to calculate a difference value (hereinafter, referred to as an "output signal difference value") between the first output signal received from the main controller 230 and the second output signal.

The sub-controller 240 may be configured to transmit the output signal difference value to the TC builder 220. The TC builder 220 may be configured to determine a confirmed TC based on the output signal difference value. In particular, the confirmed TC may be determined as a temporary TC making an output signal difference value less than or equal to a specific reference value. The TC builder 220 may be configured to discard a temporary TC making an output signal difference value exceeding the specific reference value. The TC builder 220 may be configured to sort confirmed TCs in order of the smallest output signal difference value.

Additionally, the TC builder 220 may be configured to assign a weight for each confirmed TC based on the sorting order. The TC builder 220 may be configured to generate a final TC, which is a signal group generated through a combination of an input signal(s) in place of the temporary TC, and the relevant confirmed TC assigned with the weight. The TC builder 220 may be configured to change the final TC at a sampling rate corresponding to the relevant input signal and transmit the changed final TC to the PC 250.

According to the exemplary embodiment in FIG. 2, the reason that all input signals are re-sampled to generate temporary TCs is because all the input signals are able to be simultaneously re-arranged through one "for loop", which further reduces a computing time compared to a manner of employing a plurality of "for loop".

According to the present embodiment, the TC builder 220 may be configured to perform re-sampling and inverse re-sampling through following two steps.
 1) Generating a task or a thread based on the fastest signal of input signals and then storing the all input signals with respect to the relevant task or thread.
 2) Performing a control operation to process the temporary TC by an individual task or thread having the periods of the original signals when generating the temporary TC for the stored all signals and then transmitting the temporary TC to the sub-controller 240.

Therefore, according to an exemplary embodiment, the TC builder 220 may be configured to exclude an aperiodic input signal from targets used for generating a TC. The TC builder 220 may be configured to transmit the final TC to the PC 250 through the second Ethernet switch and physical layer 282 and the third Ethernet switch and physical layer 283.

Figure 3:
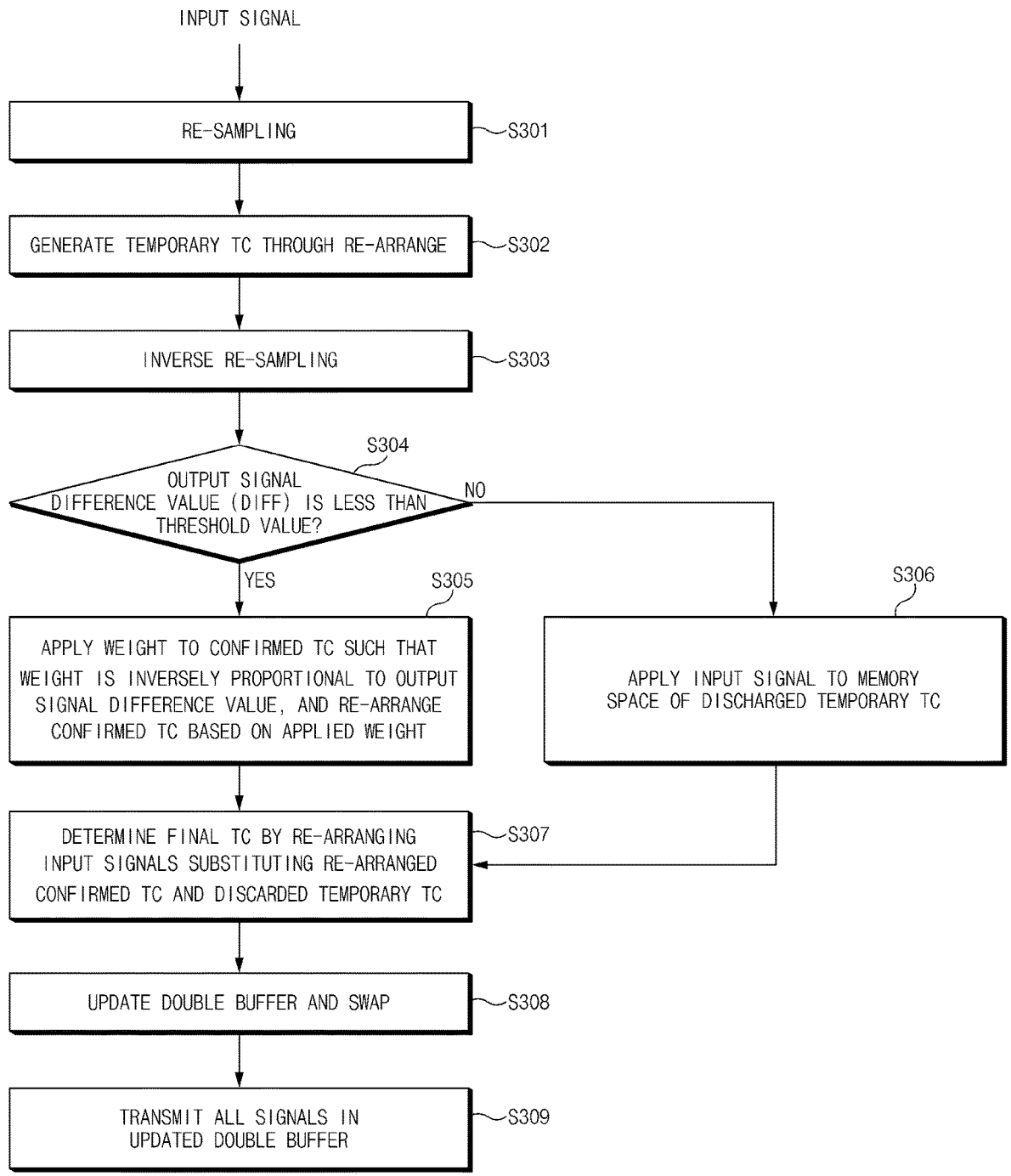
FIG. 3 is a flowchart illustrating a method for generating a test case for dynamic verification of an autonomous driving system, according to an exemplary embodiment.

FIG. 3 is a flowchart illustrating a method for generating a test case for dynamic verification of an autonomous driving system, according to an exemplary embodiment. The method for generating the test case as illustrated in FIG. 3 may include a series of operations performed by the test case builder 220 provided in the autonomous driving system 200. Hereinafter, for the convenience of explanation, the test case builder 220 will be referred to as the TC builder 220.

Referring to FIGS. 2 and 3, the TC builder 220 may be configured to re-sample an input signal at a specific time interval (S301). In particular, the re-sampling period may be determined based on the fastest signal of input signals. The TC builder 220 may be configured to generate a temporary TC by re-arranging the re-sampled input signal in a random time array (S302).

Particularly, the TC builder 220 may be configured to transmit the temporary TC to the sub-controller 240 after changing the temporary TC at the original sample rate, and transmit an input signal corresponding to the temporary TC to the main controller 230. The main controller 230 may be configured to generate a first output signal (Output 1) based on the input signal and transmit the first output signal (Output 1) to the sub-controller 240. The sub-controller 230 may be configured to generate a second output signal (Output 2) based on the temporary TC. The sub-controller 240 may be configured to generate an output signal difference value (Diff=Output2−Output1) based on the first output signal and the second output signal, and then transmit the output signal difference value to the TC builder 220.

The TC builder 220 may be configured to perform inverse re-sampling for the temporary TC and transmit the inverse re-sampling result to the sub-controller 240 (S303). The TC builder 220 may be configured to compare the output signal difference value with a specific threshold value (S304). When the output signal difference value is less than or equal to the threshold value as a result of the comparison, the TC builder 220 may be configured to determine the corresponding temporary TC as a confirmed TC. To the contrary, when the output signal difference value is greater than the threshold value as a result of the comparison, the corresponding temporary TC may be discarded.

The TC builder 220 may be configured to re-arrange the confirmed TC based on an applied weight, after applying a weight to be inversely proportional to the output signal difference value corresponding to the confirmed TC (S305). To the contrary, the TC builder 220 may be configured to apply the input signal to a memory space of the discarded temporary TC (S306). The TC builder 220 may be configured to determine a final TC by re-arranging input signals substituting the re-arranged confirmed TC and the discarded temporary TC (S307). TC builder 220 may be configured to perform update and swap operations for a double buffer (S308). The TC builder 220 may be configured to transmit all signals, which are in the updated double buffer, to the PC 230 (S309).

Figure 4:
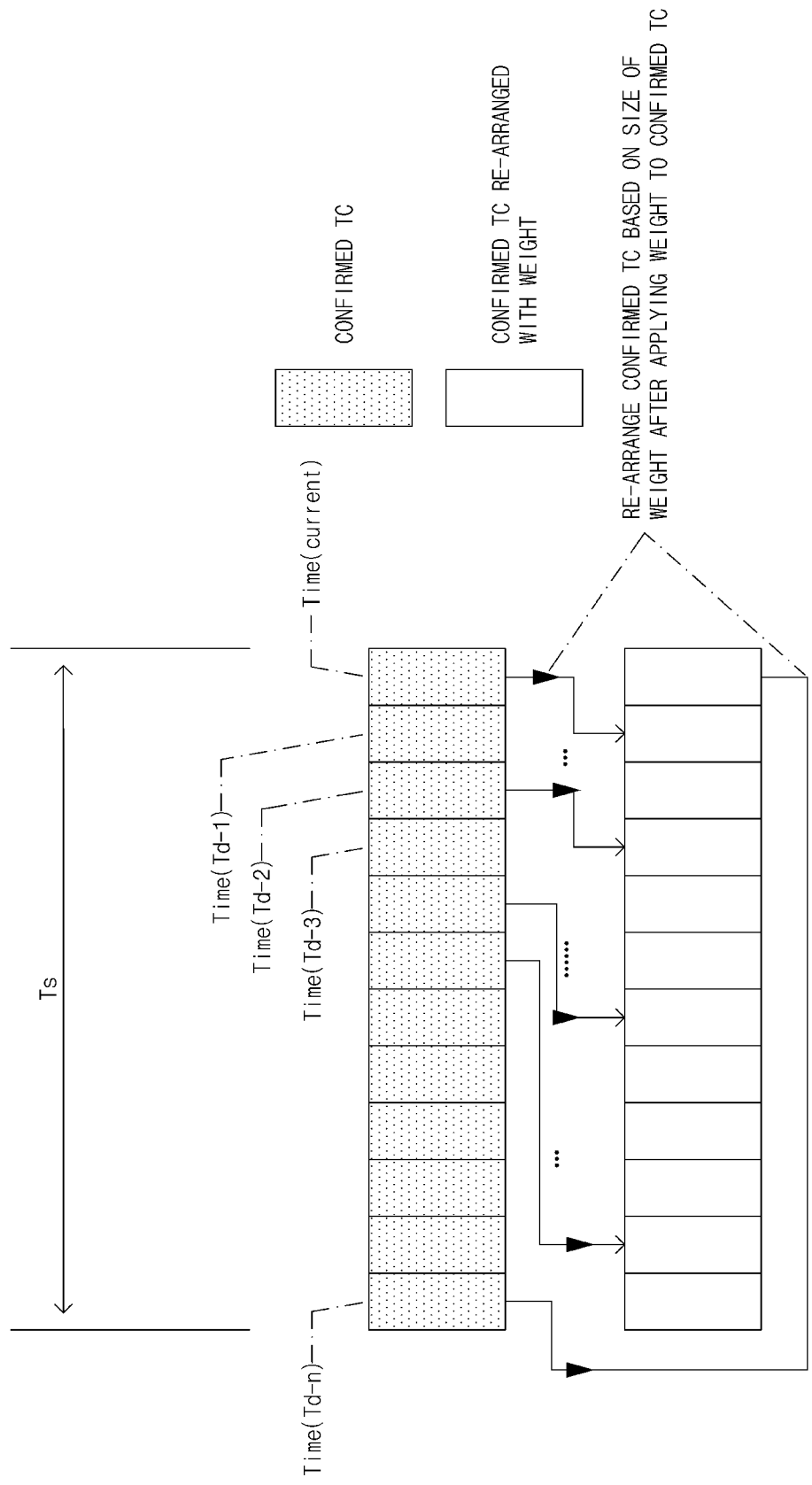
FIG. 4 is a view illustrating a procedure of re-arranging a confirmed TC, according to an exemplary embodiment.

FIG. 4 is a view illustrating a procedure of re-arranging a confirmed TC, according to an exemplary embodiment. Referring to FIGS. 2 and 4, the TC builder 220 may be configured to apply a weight based on an output signal difference value of each of the confirmed TCs generated during a specific time period Ts. The TC builder 220 may be configured to re-arrange the confirmed TC based on the size of the weight applied for each confirmed TC.

Figure 5:
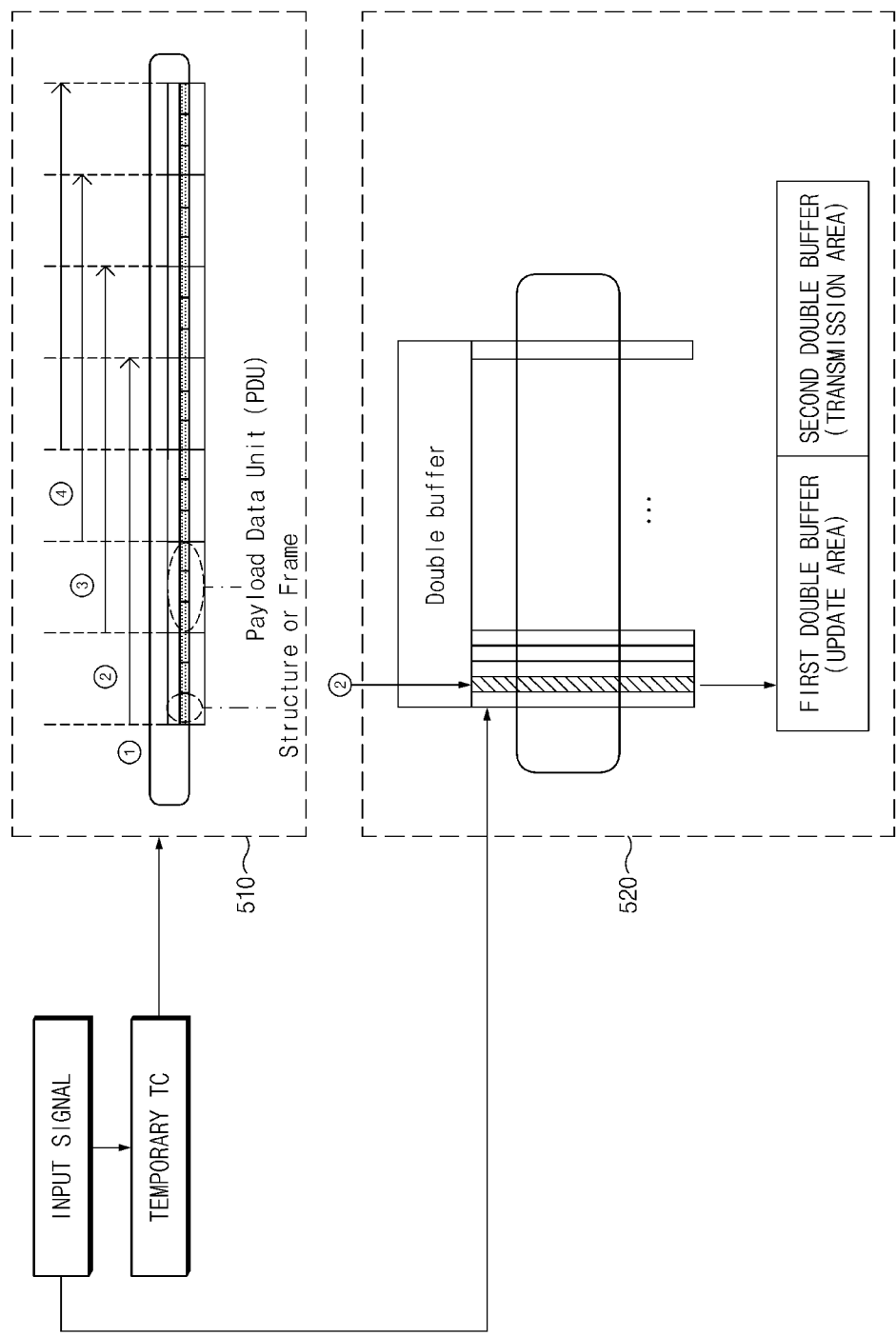
FIG. 5 is a view illustrating a procedure of updating a double buffer through a moving re-arrange scheme, according to an exemplary embodiment.

FIG. 5 is a view illustrating a procedure of updating a double buffer through a moving re-arrange scheme, according to an exemplary embodiment. Referring to FIG. 5, the re-sampled input signals may be re-arranged in a random time array through a moving re-arrange scheme, as illustrated in reference numeral 510. In particular, the re-arranged input signal (temporary TC) and the original input signal before being re-sampled may be recorded in the double buffer, as illustrated in reference numeral 520.

The double buffer according to the exemplary embodiment may include a first double buffer operating as an area for updating and a second double buffer operating as an area for transmission. The double buffer may be updated in real time through the moving re-arrange scheme and transmitted to the PC 250. According to the present disclosure, the double buffer may be updated through the moving re-arrange scheme, thereby ensuring a real-time property and a consistency property for test cases.

Figure 6:
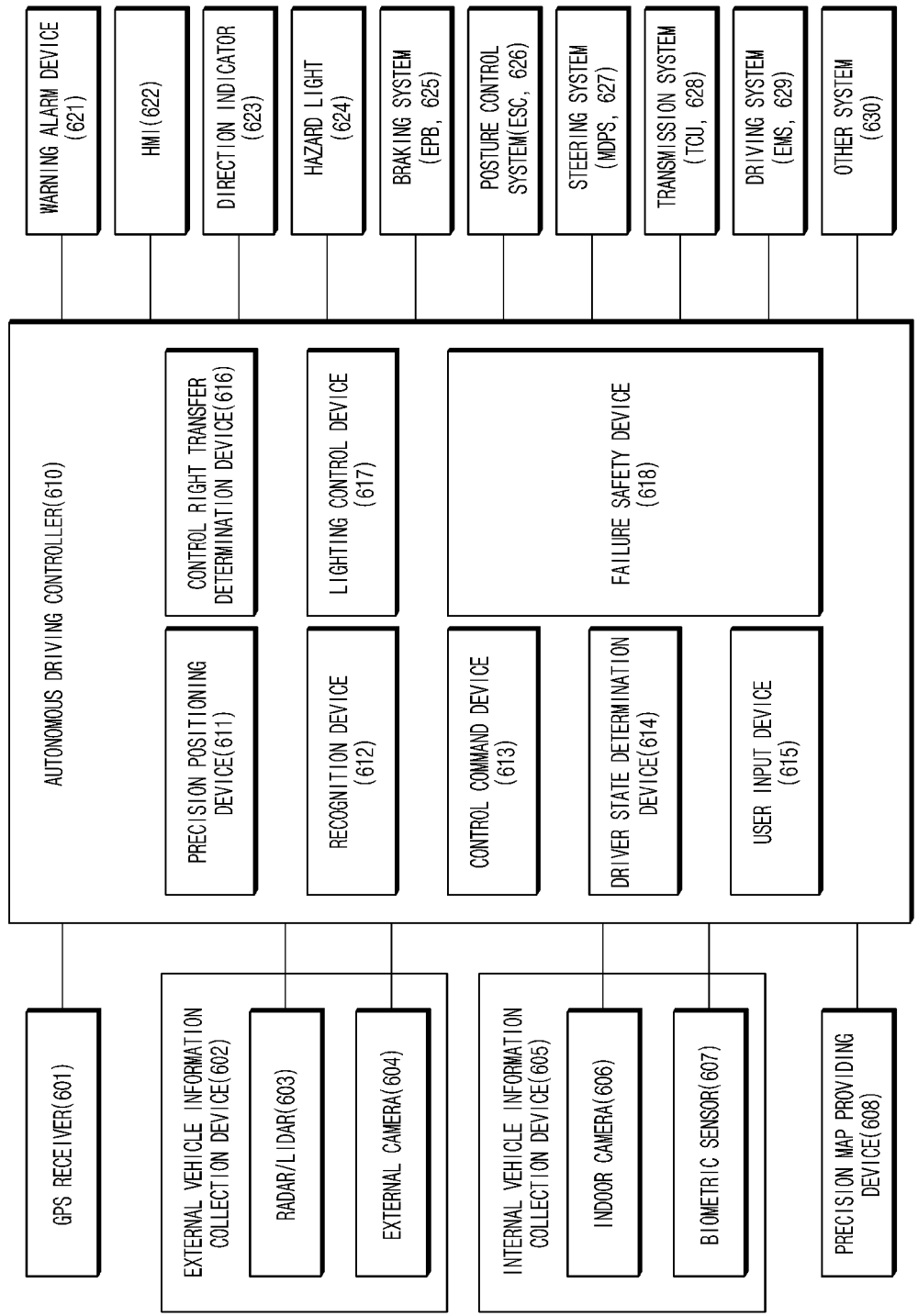
FIG. 6 is a block diagram illustrating the structure of an autonomous driving controlling device, according to another exemplary embodiment of the present disclosure.

FIG. 6 is a block diagram illustrating the structure of an autonomous driving controlling device, according to another exemplary embodiment of the present disclosure. An autonomous driving controlling device 600 as illustrated in FIG. 6 may be mounted on an autonomous driving vehicle supporting an automation level of level 2 or higher. For the convenience of explanation, the autonomous driving controlling device 600 will be simply referred to as the device 600.

Referring to FIG. 6, the device 600 may be configured by including a Global Positioning System (GPS) receiver 601, an external vehicle information collection device 602, an internal vehicle information collection device 605, a precision map providing device 608, an autonomous driving controller 610, a warning alarm device 621, a Human Machine Interface (FM) 622, a direction indicator 623, a hazard light 624, a braking system 625, a posture control system 626, a steering system 627, a transmission system 628, a driving system 629, and other systems 630.

Each of systems internetworking with the autonomous driving controller 610 may have a separate controller configured to monitor whether the system has failed or malfunctioned, and transmit the monitoring result to a failure safety device 618 of the autonomous driving controller 610. The GPS receiver 601 may be configured to receive a positioning signal from a positioning satellite. In particular, the positioning signal may be used to generate geographic location information of the vehicle.

The external vehicle information collection device 602 may be configured to collect environment information and driving state information around the vehicle. The external vehicle information collection device 602 may include a radar/LiDAR 603 and an external camera 604. The radar/LiDAR 603 may be configured to detect objects around the vehicle. The radar/LiDAR 603 may be configured to detect objects in front, side and rear of the vehicle, and calculate a distance to the detected object.

In addition, the radar/LiDAR 603 may be configured to determine whether the detected object is a static object or a dynamic object, measure the moving speed of the detected dynamic object, and determine whether the detected dynamic object is a pedestrian or a vehicle. In addition, the radar/LiDAR 603 may be used for identifying the state of a driving road and facilities through a high-resolution terrain scan manner.

The external camera 604 may be mounted outside the vehicle to capture a front, side or rear image of the vehicle. Accordingly, a plurality of external cameras may be mounted on the vehicle. The image captured by the external camera 604 may be used for lane identification, identification of an object present around the vehicle, and augmented reality implementation, but the present disclosure is not limited thereto. The internal vehicle information collection device 605 may be configured to collect information on various internal states of the vehicle. The internal vehicle information collection device 605 may include an indoor camera 606 and a biometric sensor 607.

The indoor camera 606 may be mounted on one side of the interior of the vehicle to photograph a driver and an occupant. The image captured by the indoor camera 606 may be used for monitoring the gaze direction of the driver, and the driver state (e.g., driver distraction, fatigue, or drowsy driving). The biometric sensor 607 may be mounted on one side of the vehicle to collect various biometric information of the driver. The biometric sensor 607 may be configured to collect various types of biometric information of the driver by internetworking with a driver wearable device.

For an example, the biometric information may include, but is not limited to, pulse information, heart rate information which is monitored, body temperature information, blood alcohol concentration information, brain wave information, fingerprint recognition information, or iris recognition information. The biometric information may be used for determining an inability to drive, a drunken driving state, or a drowsy driving state. The precision map providing device 608 may provide information on a precision map in response to the request of the autonomous driving controller 610.

The autonomous driving controller 610 may include a precision positioning device 611, a recognition device 612, a control command device 613, a driver state determination device 614, a user input device 615, a control right transfer determination device 616, a lighting control device 617 and a failure safety device 618. In particular, the precision positioning device 611 may be configured to determine the current position of a host vehicle by using positioning signal information, which is received from the GPS receiver 601, and the information on the precision map, which is obtained from the precision map providing device 608, and may be configured to map the current position of the host vehicle onto the precision map.

In addition, the precision positioning device 611 may be configured to identify state information (e.g., a gradient, a road type, the number of lanes, or a speed limit) of the driving road of the host vehicle. The recognition device 612 may be configured to recognize a lane, a vehicle around the host vehicle, or an obstacle and a pedestrian around the host vehicle, based on sensing information from the radar/LiDAR 603 and information on an image captured by the external camera 604.

The recognition device 612 may be configured to recognize a behavior state, such a vehicle speed, a vehicle speed behavior state (e.g., a vertical/lateral acceleration) of the vehicle by internetworking with the braking system 625, the posture control system 626, the steering system 627, the transmission system 628, and the driving system 629. The recognition device 612 may be configured to recognize the operating states of various sensors and actuators provided in the vehicle in internetworking with the failure safety device 618.

The control command device 613 may be configured to calculate a required command value based on the recognition result of the recognition device 612, and transmit the calculated required command value to the corresponding autonomous driving system to control driving and an autonomous driving level. The driver state determination device 614 may be configured to determine the driver state based on information on an internal vehicle state obtained from the internal vehicle information collection device 605. In particular, the driver state may include, but is not limited to, a distraction state, an inability state to drive, a drunken driving state, a drowsy driving state, or a fatigue level.

The user input device 615 may be configured to detect a user input in response to a control signal received from the HMI 622. Particularly, the user input may include an input signal for a specified button or a specified gesture for accepting the transfer of a control right from the system to the driver. In addition, the user input may include a user response to a request to confirm the change in the autonomous driving level.

The control right transfer determination device 616 may be configured to determine whether a control right needs to be transferred from the system to the driver for operating the vehicle, based on at least one of various types of cognitive information obtained from the recognition device 312, information on an internal vehicle state obtained from the internal vehicle information collection device 605, or information on a driver input obtained from the user input device 315 When the control right needs to be transferred as a result of the determination, the control right transfer determination device 616 may be configured to perform a control operation to output a specific warning alarm message for requesting the transfer of the control right to the driver by transmitting a specific control signal to the warning alarm device 621.

The lighting control device 617 may be configured to adjust the lighting of the direction indicator 623 and the hazard light 624. The failure safety device 618 may be configured to determine the optimal failure safety strategy, based on the type of failure detected during autonomous driving and the driving situation around the vehicle. The failure safety device 618 may be configured to request the control command device 313 to execute the control based on the failure safety strategy.

The detailed configuration and the detailed operation of the failure safety device 618 will be more clarified through the description of the drawings to be described later. The braking system 625 may be configured to execute the operation of the braking-related actuator and monitor the state of the braking-related actuator. For an example, the braking system 625 may include an electric parking brake (EPB) which generates braking force using an electronic manner rather than a physical force of a person The posture control system 626 may be configured to operate an actuator to stably maintain the posture of a vehicle body. For an example, the posture control system 626 may include an Electronic Stability Control (ESC) which is an advanced electronic braking device. The ESC is a device which controls the posture of the vehicle by adjusting the braking force and driving force of the vehicle together. The ESC may provide both an Anti-lock Brake System (ABS) function and a Tracibility Control System (TCS) function. The ESC may be configured to determine whether the posture of the vehicle body is stably maintained, by synthesizing information obtained through the measurement of a steering angle, a lateral acceleration, a yaw-rate, and a wheel speed sensor, and may operate in a manner of adjusting the braking force of four wheels based on the information.

The steering system 627 may be configured to operate an actuator to adjust the lateral behavior of the vehicle. For an example, the steering system 627 may include Motor Driven Power Steering (MDPS). The MDPS, which is a device that assists the handling of a driver using an electronic motor instead of hydraulic pressure, may have a dual power input structure and a plurality of signal channels for stable power supply and signal transmission/reception.

The transmission system 628 may be configured to operate an actuator for automatic transmission. For an example, the transmission system 623 may include an automatic transmission control unit (TCU). The TCU may be configured to operate the automatic transmission by determining a gear stage and timing based on a TPS, a vehicle speed, an RPM of an engine, or a brake switch input.

The driving system 629 may be configured to operate the actuator to adjust a longitudinal behavior (that is, a driving speed) of the vehicle. For example, the actuator for adjusting the longitudinal behavior (that is, a driving speed) may include a throttle or an accelerator. For an example, the driving system 629 may include an engine management system (EMS). The EMS may be configured to perform an electronic throttle control function, a gasoline direct injection function, or an idle stop and go function.

Other systems 630 may include a tire pressure measurement system, such as a Tire Pressure Monitoring System (TPMS), to measure the air pressure of a tire, a fuel tank sensing system, and a battery management system provided in a hybrid vehicle and an electric vehicle, but the disclosure is not limited thereto. As described above, the present disclosure may provide the method and the apparatus for generating the test case for dynamic verification of the autonomous driving vehicle.

In addition, the present disclosure may provide the method and the apparatus for generating the test case for dynamic verification of the autonomous driving vehicle, capable of generating the reliable test case, based on data measured in a real vehicle to dynamically verify autonomous driving software and improve overall driving safety. Further, the present disclosure may provide the method and the apparatus for generating the test case for dynamic verification of the autonomous driving vehicle, in which the dynamic verification result is automatically output at the time point at which the operation of the autonomous driving controller is completed, so the additional engineering effect is not made thus further improving driving safety.

In addition, the test case generated according to the present disclosure reflects the real environment characteristic in which the autonomous driving controller operates.

Accordingly, the reliability for the dynamic verification result may be improved and the dynamic verification results may be effectively used in determining the limitation of the autonomous driving system. Besides, a variety of effects directly or indirectly understood through the disclosure may be provided.

The operations of the methods or algorithms described in connection with the processor embodiments disclosed in the present disclosure may be directly implemented with a hardware module, a software module, or the combinations thereof, executed by the processor. The software module may reside on a storage medium (that a memory and/or a storage), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor. The processor may read out information from the storage medium and may write information in the storage medium. Alternatively, the storage medium may be integrated with the processor. The processor and storage medium may reside in an application specific integrated circuit (ASIC). The ASIC may reside in a user terminal. Alternatively, the processor and storage medium may reside as separate components of the user terminal.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A method for generating a test case (TC) for dynamic verification of an autonomous driving system, comprising:
   receiving, by a controller including a processor, an input from an external sensor and a signal gateway;
   generating, by the controller, a temporary TC based on the input signal;
   determining, by the controller, a confirmed TC based on a first output signal corresponding to the input signal and a second output signal corresponding to the temporary TC;
   determining, by the controller, a final TC by re-arranging the confirmed TC; and
   transmitting, by the controller, the final TC to an external device for verification of software installed within the autonomous driving system;
   wherein the external sensor includes at least one of a Global Navigation Satellite System (GNSS), a camera, a LiDAR, or a radar, or any combination thereof, and
   wherein the external sensor and the signal gateway are included in the autonomous driving system,
   wherein the method further comprises:
      comparing, by the controller, a difference value between the first output signal and the second output signal with a specified threshold value;
      applying, by the controller, a weight to the confirmed TC, wherein the weight is inversely proportional to the first difference value; and
      re-arranging, by the controller, the confirmed TC based on the weight;
      wherein a first temporary TC making a first difference value less than the threshold value is determined as the confirmed TC, and
      wherein a second temporary TC making a second difference value equal to or greater than the threshold value is discarded.

2. The method of claim 1, wherein the generating of the temporary TC based on the input signal includes:
   re-sampling, by the controller, the input signal; and
   re-arranging, by the controller, the re-sampled input signal in a random time array manner.

3. The method of claim 2, wherein the input signal is re-sampled in a specific period, and the specific period is determined based on a fastest signal of the input signal.

4. The method of claim 3, further comprising:
   performing, by the controller, inverse re-sampling for the temporary TC and transmitting an inverse re-sampling result to a sub-controller including a processor; and
   transmitting, by the controller, the input signal to a main controller including a processor,
   wherein the first output signal is generated by the main controller and transmitted to the sub-controller, and
   wherein the second output signal is generated by the sub-controller.

5. The method of claim 1, wherein the final TC is determined by re-arranging input signals substituting the re-arranged confirmed TC and the discharged temporary TC.

6. The method of claim 5, further comprising:
   updating and swapping, by the controller, a double buffer in real time through a moving re-arrange scheme; and
   transmitting, by the controller, all signals, contained in the double buffer, to a personal computer (PC) for verification of the software.

7. An apparatus for generating a test case (TC) for dynamic verification of an autonomous driving system, comprising:
   a sensor configured to output an input signal;
   a TC builder including a processor and configured to generate a temporary TC based on the input signal received from the sensor and a signal gateway;
   a main controller including a processor and configured to generate a first output signal based on the input signal received from the TC builder; and
   a sub-controller including a processor and configured to generate a second output signal by receiving the temporary TC from the TC builder,
   wherein the TC builder is configured to transmit a final TC to an external device after re-arranging a confirmed TC, and
   wherein the confirmed TC is determined based on a difference value between the first output signal and the second output signal for verification of software installed with the autonomous driving system,
   wherein the sensor includes at least one of a Global Navigation Satellite System (GNSS), a camera, a LiDAR, or a radar, or any combination thereof, and
   wherein the sensor and the signal gateway are included in the autonomous driving system,
   wherein the TC bulider is further configured to:
      determine, a first temporary TC making a first difference value as the confirmed TC, wherein the first difference value is between the first output signal and the second output signal and less than a specified threshold value;

discard a second temporary TC making a second difference value, wherein the second difference value is between the first output signal and the second output signal and equal to or greater than the threshold value;

apply a weight to the confirmed TC, wherein the weight is inversely proportional to the first difference value; and re-arrange the confirmed TC based on the weight.

8. The apparatus of claim 7, wherein the TC builder is configured to generate the temporary TC by re-sampling the input signal and re-arranging a re-sampled input signal in a random time array.

9. The apparatus of claim 8, wherein the input signal is re-sampled in a specific period, and wherein the specific period is determined based on a fastest signal of the input signal.

10. The apparatus of claim 9, wherein the TC builder is configured to perform inverse re-sampling for the temporary TC and transmit an inverse re-sampling result to the sub-controller, and wherein the first output signal is transmitted to the sub-controller, and wherein the sub-controller is configured to calculate a difference value between the first output signal and the second output signal and transmits the difference value to the TC builder.

11. The apparatus of claim 7, wherein the final TC is determined by re-arranging input signals substituting the re-arranged confirmed TC and the discharged temporary TC.

12. The apparatus of claim 11, wherein the TC builder is configured to:

update and swap a double buffer in real time through a moving re-arrange scheme; and transmit all signals to a personal computer (PC) for verification of the software, wherein the all signals are contained in the double buffer.

* * * * *